United States Patent
Uchida et al.

(10) Patent No.: US 9,583,755 B2
(45) Date of Patent: Feb. 28, 2017

(54) METHOD FOR MANUFACTURING LITHIUM ION SECONDARY BATTERY

(71) Applicants: Yozo Uchida, Toyota (JP); Kazuhiro Suzuki, Toyota (JP); Hiroyuki Sekine, Yokohama (JP); Taku Matsumura, Yokohama (JP); Kunihito Arai, Yokohama (JP)

(72) Inventors: Yozo Uchida, Toyota (JP); Kazuhiro Suzuki, Toyota (JP); Hiroyuki Sekine, Yokohama (JP); Taku Matsumura, Yokohama (JP); Kunihito Arai, Yokohama (JP)

(73) Assignees: Toyota Jidosha Kabushiki Kaisha, Toyota-shi, Aichi-ken (JP); Zeon Corporation, Chiyodaku, Tokyo (JP)

( * ) Notice: Subject to any disclaimer, the term of this patent is extended or adjusted under 35 U.S.C. 154(b) by 0 days.

(21) Appl. No.: 14/029,877

(22) Filed: Sep. 18, 2013

(65) Prior Publication Data

US 2014/0079872 A1    Mar. 20, 2014

(30) Foreign Application Priority Data

Sep. 19, 2012   (JP) ................. 2012-205697
Sep. 5, 2013    (JP) ................. 2013-183893

(51) Int. Cl.
*H01M 4/04*       (2006.01)
*H01M 4/62*       (2006.01)
*H01M 10/0525*    (2010.01)

(52) U.S. Cl.
CPC ......... *H01M 4/0404* (2013.01); *H01M 4/621* (2013.01); *H01M 10/0525* (2013.01);

(Continued)

(58) Field of Classification Search
CPC .......... Y02E 60/122; B41F 9/00; H01M 4/04; H01M 4/0404; H01M 4/0435; Y02T 10/7011

(Continued)

(56) References Cited

U.S. PATENT DOCUMENTS

2008/0311479 A1   12/2008  Lee et al.
2010/0015328 A1*   1/2010  Hirokawa ............. H01G 9/058
                                                            427/80

(Continued)

FOREIGN PATENT DOCUMENTS

CN        101399335 A      4/2009
CN        102074698 A      5/2011

(Continued)

OTHER PUBLICATIONS

Document#1, http://www.polymerprocessing.com/polymers/PVDF.html.*

*Primary Examiner* — Tabassom Tadayyon Eslami
(74) *Attorney, Agent, or Firm* — Finnegan, Henderson, Farabow, Garrett & Dunner, LLP

(57) ABSTRACT

A method for manufacturing a lithium ion secondary battery having electrodes in which a mix layer including a first binder and one of a positive electrode active material and a negative electrode active material is formed via a second binder on a collector. The method includes: performing pattern coating of the second binder on the surface of the collector and regularly forming binder-coated sections and uncoated sections; and feeding a powder of mix particles on the binder-coated sections and the uncoated sections so as to form the mix layer on the collector.

5 Claims, 14 Drawing Sheets

(52) U.S. Cl.
CPC .......... *H01M 4/0435* (2013.01); *Y02E 60/122* (2013.01); *Y02P 70/54* (2015.11); *Y02T 10/7011* (2013.01)

(58) Field of Classification Search
USPC ...... 429/209, 231.8; 427/211, 208.6, 208.11, 427/278, 428.02, 194, 257, 258, 261, 266, 427/504, 510, 511, 197, 207.1, 63, 102, 427/256, 58; 430/307
See application file for complete search history.

(56) References Cited

U.S. PATENT DOCUMENTS

2010/0062570 A1* 3/2010 Test .............................. 438/123
2012/0135304 A1   5/2012 Uchida et al.
2012/0321945 A1* 12/2012 Park ............................. 429/211

FOREIGN PATENT DOCUMENTS

| | | |
|---|---|---|
| JP | 11-73947 | 3/1999 |
| JP | 2003-297667 | 10/2003 |
| JP | 2004-79370 | 3/2004 |
| JP | 2005-340188 | 12/2005 |
| JP | 2010-98186 | 4/2010 |
| JP | 2011-216197 | 10/2011 |
| JP | 2012-129123 | 7/2012 |
| JP | 2013-12327 | 1/2013 |
| KR | 10-20070060023 | 6/2007 |
| WO | WO 2011/013414 | 2/2011 |

* cited by examiner

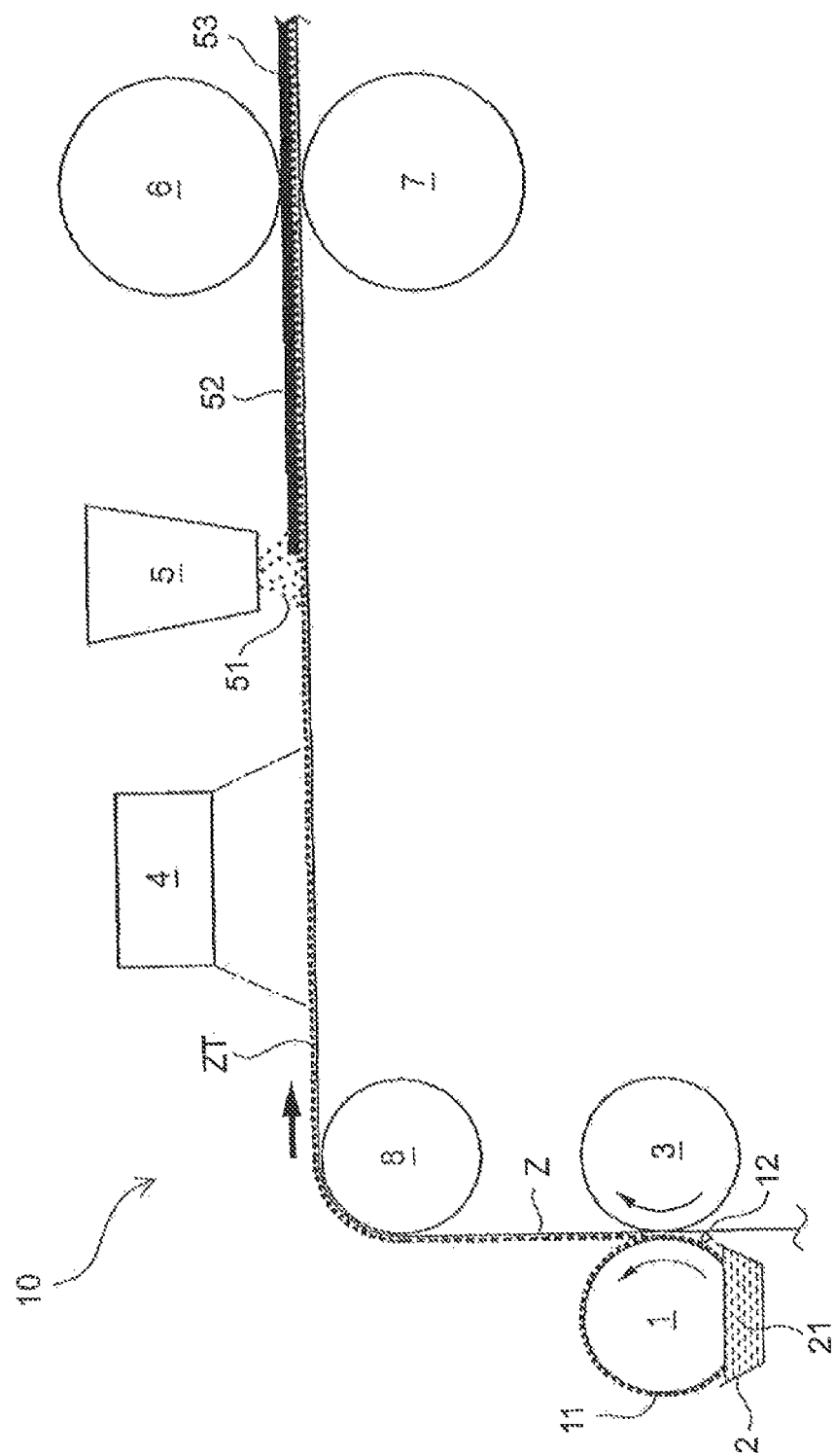

FIG. 4A  ELLIPSES
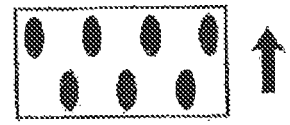
FIG. 4B  RHOMBS
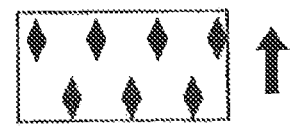
FIG. 4C  VERTICAL LINES
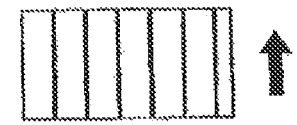
FIG. 4D  INCLINED LINES
FIG. 4E  GRID PATTERN
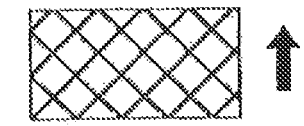

METHOD FOR MANUFACTURING LITHIUM ION SECONDARY BATTERY

INCORPORATION BY REFERENCE

The disclosures of Japanese Patent Applications Nos. 2012-205697 filed on Sep. 19, 2012 and 2013-183893 filed on Sep. 5, 2013, each including the specification, drawings and abstract, are incorporated herein by reference in their entireties.

BACKGROUND OF THE INVENTION

1. Field of the Invention

The invention relates to a method for manufacturing a lithium ion secondary battery. In particular, the invention relates to a method for manufacturing a lithium ion secondary battery by performing pattern coating of a binder on a collector for a positive electrode or a negative electrode and then layering mix particles including an active material thereupon.

2. Description of Related Art

The growing popularity of hybrid automobiles and electric automobiles has recently increased a need for lithium ion secondary batteries that are used as drive power sources therefor, and a demand has accordingly been created for increased production efficiency, reduced size, and increased capacity of such batteries. A lithium ion secondary battery is manufactured by winding a positive electrode sheet and a negative electrode sheet, with a separator being interposed therebetween, inserting the resultant electrode body into a case, pouring an electrolytic solution, and sealing the case. A coated electrode manufactured by kneading an active material and a binder in a solvent to obtain a slurry-like paste, applying the paste in a thin-film form on the surface of a collector such as an aluminum foil or a copper foil, and then performing drying and pressing is generally recognized as an electrode (positive electrode and negative electrode) of a lithium ion secondary battery. However, in the conventional coated electrode, heat convection from the solvent in the drying process tends to cause migration in which the active material and the binder become detached in the paste applied in a thin-film form and the binder segregates to the upper side of the film. Where the active material and the binder are detached, the active material can be easily peeled off from the separator following expansion-contraction of the active material during charging and discharging, thereby reducing the electrode service life. Further, where the binder segregates to the upper side of the film, the conduction paths by which lithium ions are transferred through the electrolytic solution are unlikely to be formed in the electrode. The resultant problem is that the conventional coated electrodes cannot fully meet the demand for reduced size and increased capacity of lithium ion secondary batteries. Accordingly, Japanese Patent Application Publication No. 2004-79370 (JP-2004-79370 A) discloses a technique (the so-called two-layer coating method) of applying a first layer mainly including a binder on a collector surface and then applying a second layer including an active material and a binder thereupon, in which the first layer demonstrates a bonding strength higher than that of the second layer (the so-called two-layer coating method).

However, the problem associated with the technique disclosed in JP-2004-79370 A is that separate drying processes are required for the first layer and second layer, whereby the drying equipment is increased in size and the production efficiency is reduced. Further, since a method is used by which the active material, the binder, and the like are kneaded in a solvent, the resultant paste is applied, and the solvent is then evaporated in the drying process, the evaporated solvent itself and the drying energy are wasted.

SUMMARY OF THE INVENTION

The inventors have examined a novel method for manufacturing a lithium ion secondary battery by which a binder solution in which a binder is dispersed in a solvent is thinly applied on a collector surface, a powder component including at least an active material and a binder is deposited thereupon, and the deposited layer of the binder solution and powder component on the collector is heated and pressurized by rollers. With this manufacturing method, a large-scale drying process becomes unnecessary, the production efficiency increases, and the cost of solvent and drying energy can be reduced.

However, in the above-described novel method for manufacturing a lithium ion secondary battery, the binder solution is applied over the entire collector surface. Therefore, even when the deposited layer of the powder component (powdered mix) including the active material and the binder, which is fed on the coated binder, is heated and pressurized, the binder applied on the collector surface remains as a thin insulating film between the collector and the active material, and the electric resistance in the direction perpendicular to the surface of the electrode sheet (referred to hereinbelow as "penetration resistance" in particular, the reaction resistance of a cell measured under a low-temperature environment is referred to as "low-temperature reaction resistance") increases.

The invention provides a method for manufacturing a lithium ion secondary battery that has high production efficiency and makes it possible to reduce the penetration resistance of electrodes, while maintaining a high peel strength of the collector and active material.

The first aspect of the invention relates to a method for manufacturing a lithium ion secondary battery having electrodes in which a mix layer including a positive electrode active material or a negative electrode active material and a first binder is formed via a second binder on a collector. The manufacturing method includes: performing pattern coating of a binder coating liquid including the second binder on a surface of the collector to regularly form binder-coated sections and uncoated sections; and feeding a powder of mix particles including the positive electrode active material or the negative electrode active material and the first binder on the binder-coated sections and the uncoated sections and forming the mix layer on the collector.

With the abovementioned method, the binder-coated sections and the uncoated sections are formed regularly by performing pattern coating of the binder coating liquid on the collector surface. Therefore, coated sections where the second binder has been applied and uncoated sections where the second binder has not been applied are regularly formed on the collector surface. The pattern coating as referred to herein indicates the process of performing coating of a coating liquid on a base material in a specific pattern shape such as dots or columns. Therefore, with the second binder regularly applied on the collector surface, it is possible to cause a powder of mix particles that is fed thereupon to form a layer on the collector. Thus, since the second binder is partially applied on the collector surface, the mix particles fed on the second binder can be bonded to the collector.

Further, since the mix particles include a binder and one of a positive electrode active material and a negative electrode active material, the particles of the positive electrode active material or the particles of the negative electrode active material can be bonded together by the first binder contained in the powder of mix particles. As a result, the collector and the active material can be bonded by the second binder that has been applied by performing pattern coating on the collector surface, and the active material particles can be bonded together by the first binder contained in the powder of mix particles. In other words, the active material not bonded to the collector surface can be bonded as the entire mix layer to the collector by bonding together the adjacent active material particles. Therefore, a mix layer having active material particles bonded together is formed on the collector, and the peel strength of the mix layer to the collector can be ensured.

Meanwhile, the sections that are not coated with the second binder are also regularly formed on the collector. The uncoated sections constitute the exposed sections of the collector surface that are not covered by the binder. Therefore, the collector and the active material can be brought into direct contact with each other in the exposed sections of the collector surface. As a result, in the exposed sections of the collector surface, no binder serving as an insulator is interposed between the collector and the active material, conduction paths can be formed, and a contribution can be made to the reduction of penetration resistance (low-temperature reaction resistance) in the electrode sheet.

Further, since the powder of mix particles is fed on the binder-coated sections and the uncoated sections to form the mix layer on the collector, the solvent for kneading the mix into a paste and the drying process for evaporating the solvent are not needed. Therefore, the waste of solvent materials and energy on drying can be greatly reduced. Further, a powder feeder for feeding the powder of mix particles is needed, but since a drying apparatus, which is typically of a large size, is not required, the equipment cost and installation space as a whole can be greatly reduced and efficient production can be ensured.

The coating film thickness in the coated sections of the pattern-coated second binder may be about 1.5 μm, and the film thickness of the deposited layer that is layered by feeding the powder of mix particles may be about 100 μm to 120 μm. The deposited layer may be pressure molded and compressed to a film thickness of about 80 μm. In this case, the active material and the second binder are closely attached to each other and a mix layer is formed. The coating film thickness in the coated sections of the pattern-coated second binder is described below in greater detail. Thus, it is preferred that the Wet film thickness prior to drying (coating film thickness immediately after the coating) be 1.0 μm to 6.0 μm (the target value is 1.5 μm) and the Dry film thickness after drying be 0.1 μm to 3.0 μm (the target value is 0.7 μm). Where the coating film thickness in the coated sections of the second binder is about 1.5 μm, the drying process after the pattern coating is unnecessary. This is because the amount of the solvent used is small, and therefore the solvent is absorbed by the powder and vaporized during pressure molding when the mix layer is formed on the collector. As a result, the electrodes can be produced with even better efficiency.

The pattern coating may be performed by intaglio gravure coating.

when the pattern coating is performed by intaglio gravure coating, it is possible to realize a thin-film high-speed coating process in which the coating film thickness in the coated sections of the second binder is about several microns. Therefore, the second binder can be thinly applied with high accuracy, and unnecessarily thick coating is avoided. Therefore, when the powder of mix particles is layered and then pressurized with rollers, the unnecessary spread of the second binder on the collector is reduced. As a result, the binder, which is an insulator, is not interposed in the exposed sections of the collector surface, conductive paths can be reliably formed between the collector and the active material, and the penetration resistance of the collector sheet is further reduced. Further, since the viscosity of the coating liquid that can be used in the intaglio gravure coating can be in a wide range of several centipoises (cps) to about 3000 cps, for example, where a high-viscosity coating liquid is used, the process has higher utility than the ink-jet process in which such coating liquid easily clogs the nozzles.

In the planar shape of the coated sections, the length in the direction parallel to the conveying direction of the collector may be larger than the length in the direction perpendicular to the conveying direction.

When the planar shape of the coated sections is such that the length in the direction parallel to the conveying direction of the collector is larger than the length in the direction perpendicular to the conveying direction, the air is prevented from being enclosed in the intaglio incised on the gravure roll. Thus, when the gravure roll is rotated and the binder coating liquid is applied on the surface of the collector that is being conveyed, where the depressions of the intaglio are perfectly round, there are no escape routes for the air that has entered the intaglio. As a result, the air remains therein and the binder coating liquid located in the intaglio may not be accurately transferred to the collector surface.

By contrast, when the planar shape of the coated sections is such that the length in the direction parallel to the conveying direction of the collector is larger than the length in the direction perpendicular to the conveying direction, escape routes for the air are formed in the direction parallel to the conveying direction, and the air is unlikely to be enclosed in the intaglio of the gravure roll. As a result, the binder coating liquid located in the intaglio is accurately transferred to the collector surface. For example, rhombs extending in the conveying direction or ellipses extending in the conveying direction are suitable shapes of the coated sections. The intaglio may be in the form of vertical lines parallel to the conveying direction, inclined lines that are inclined against the conveying direction, or a grid pattern extending in the conveying direction.

The intaglio gravure roll that is used for the intaglio gravure coating may be incised with a plurality of groove-shaped depressions having intersections where the grooves intersect with each other, the binder coating liquid supplied to the groove-shaped depressions may shrink to the intersections, and the shrunk binder coating liquid may be coated on the collector in a dot shape.

When the intaglio gravure roll that is used for the intaglio gravure coating is incised with a plurality of groove-shaped depressions having intersections where the grooves intersect with each other, the binder coating liquid supplied to the groove-shaped depressions shrinks to the intersections, and the shrunk binder coating liquid is coated on the collector in a dot shape, the dot-shaped coated sections can be uniformly formed on the collector. Thus, since the groove-shaped depressions incised on the intaglio gravure roll used for intaglio gravure coating have no wall surfaces in the groove extension directions and are open, the air escapes in the groove extension directions and the binder coating liquid may easily penetrate into the groove-shaped depressions. Further, since the groove-shaped depressions are open in the groove extension directions and are not surrounded on the entire circumference by the wall surfaces as in the dot-shaped depressions, the liquid retention ability is low. In particular, the liquid retention ability in the intersections is lower than in other portions of the groove-shaped depressions.

Meanwhile, the binder coating liquid inside the groove-shaped depressions has a property of collecting in the intersections where the interfacial tension from the wall surface of the groove-shaped depressions is minimal and shrinking into a dot-like shape. Therefore, the binder coating liquid that has collected in the intersections and shrunk into a dot-like shape may be reliably transferred to the collector because the liquid retention ability in the intersections is lower than in other sections. Thus, dot-shaped coated sections can be uniformly formed on the collector in the intaglio gravure coating process.

The groove-shaped depressions may be formed in a grid-shape pattern with a groove width of 10 μm to 40 μm, a groove pitch of 23 μm to 40 μm, and a groove depth of 5 μm to 20 μm, and the collector and the binder coating liquid may be selected such that a contact angle formed between the tangent of a liquid drop to the surface of the collector and the collector surface when the binder coating liquid is dropped on the collector is equal to or greater than 50 degrees.

In such a case, the dot-shaped coated sections on the collector can be formed even more uniformly. More specifically, a groove width of 10 μm to 40 μm is selected because where the groove width is less than 10 μm, the binder coating liquid partially segregates and coated sections of uniform size are difficult to form. Where the groove width exceeds 40 μm, the liquid shrinks along the wall surface and a constant dot shape is difficult to form. A groove pitch of 23 μm to 40 μm is selected because where the groove pitch is less than 23 μm, the adjacent portions of the binder coating liquid coalesce and coated sections of uniform size are difficult to form. Where the groove pitch exceeds 40 μm, the dot shape of the shrinking liquid becomes uneven. A groove depth of 5 μm to 20 μm is selected because where the groove depth is less than 5 μm, the necessary Wet film thickness cannot be obtained, and where the groove depth exceeds 20 μm, the liquid retention ability increases and it is highly probable that part of the binder coating liquid will not be transferred.

Further, the contact angle formed between the tangent of the liquid drop to the collector surface and the collector surface when the binder coating liquid is dropped on the collector is set to be equal to or greater than 50 degrees because where the contact angle is less than 50 degrees, wettability of the binder coating liquid increases and the binder coating liquid is unlikely to shrink to the intersections of the groove-shaped depressions. Where a thickening agent (for example, carboxymethyl cellulose (CMC)) is added to the binder coating liquid, the contact angle tends to increase. Where a surfactant is added, the contact angle tends to decrease. Therefore, the liquid shrinkage can be increased and coated sections of a uniform dot shape can be formed by adding a predetermined amount (about 0.2 wt % to 0.4 wt %) of CMC to the binder coating liquid.

By using a trial-and-error approach, the inventors have experimentally discovered that from the standpoint of obtaining a Wet film thickness of 1.0 μm to 6.0 μm prior to drying (target value 1.5 μm), it is preferred that the groove-shaped depressions incised on the intaglio gravure rolls that are used for the intaglio gravure coating process be formed in a grid-shape pattern with a groove depth of 5 μm to 20 μm, a groove width of 10 μm to 40 μm, and a groove pitch of 23 μm to 40 μm, and that the contact angle formed between the tangent of the liquid drop to the collector surface and the collector surface when the binder coating liquid is dropped on the collector be equal to or greater than 50 degrees.

The glass transition temperature of the second binder used for the binder coating liquid may be within a range −50° C. to 30° C.

When the glass transition temperature of the second binder used for the binder coating liquid is within a range −50° C. to 30° C., the flexibility and adhesivity of the second binder can be ensured even after drying. Therefore, where the pressurizing is performed at a room temperature when the mix layer is formed, even when the second binder is dried, the bonding strength between the collector and the active material and the bonding strength between the active material particles are increased and a positive effect is produced on the peel strength of the electrodes and the formation of the conductive paths. The tests conducted by the inventors confirm that where a styrene-butadiene rubber (SBR) is used as the second binder and the glass transition temperature thereof is made equal to or higher than −50° C., the 90-degree peel strength is increased about four times over that attained when the glass transition temperature is less than −50° C.

The exposed surface area ratio of the collector in the pattern coating process may be within a range of 10% to 85%.

In the invention, the exposed surface area ratio of the collector in the pattern coating process means a ratio of the surface area occupied by the uncoated sections to the surface area occupied by the binder-coated sections applied with the binder coating liquid and the uncoated sections. Since the exposed surface area ratio of the collector in the pattern coating process is equal to or greater than 10%, the low-temperature reaction resistance at −30° C. of the electrode sheet can be made equal to or lower than that of the conventional coated electrodes. Further, the tests conducted by the inventors have confirmed that where the exposed surface area ratio is about 10%, the low-temperature reaction resistance at −30° C. can be reduced by about 20% with respect to that in the case where the exposed surface area is 0% (the entire surface is applied with the binder solution).

Since the exposed surface area ratio of the collector in the pattern coating process is equal to or less than 85%, the 90-degrees peel strength of the mix layer formed on the collector can be made equal to or higher than a predetermined reference value (for example, about 1.5 N/m which is the level of the conventional coated electrodes). Therefore, by setting the exposed surface area ratio of the collector in the pattern coating process to a range of 10% to 85%, it is possible to obtain both the peel strength of the electrode sheet which is equal to or higher than those of the conventional electrodes and the penetration resistance of the electrode sheet which is equal to or lower than those of the conventional electrodes. It is further preferred that the exposed surface area ratio of the collector in the pattern coating process be 50% to 70%. The low-temperature reaction resistance at −30° C. in this case can be reduced by about 30% with respect to the level of the conventional coated electrodes. This value is at the same level as that obtained, for example, with the method by which a powder of mix particles is layered on a carbon-coated collector in a negative electrode sheet.

In accordance with the invention, it is possible to provide a method for manufacturing a lithium ion secondary battery that has high production efficiency and makes it possible to reduce the penetration resistance of electrode sheets, while maintaining a high peel strength of the collector and active material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 shows part of the apparatus for manufacturing the lithium ion secondary battery according to the first embodiment;

FIGS. 4A to 4E show pattern shape examples of the intaglio in the manufacturing apparatus shown in FIG. 3;

DETAILED DESCRIPTION OF EMBODIMENTS

An embodiment of the invention will be explained below in greater detail with reference to the appended drawings. First, the structure of a lithium ion secondary battery will be explained in a simple manner, and then the first embodiment in which a mix layer is formed on one surface of a collector will be explained in greater detail. Then, the second embodiment in which a mix layer is formed at both surfaces of the collector will be explained in detail. Finally, a third embodiment will be explained in greater detail in which groove-shaped depressions having intersections in which the grooves intersect with each other are engraved on an intaglio gravure roll, a binder coating liquid supplied into the groove-shaped depressions shrinks to the intersections, and dot-shaped coated sections are formed on the collector.

<Structure of Lithium Ion Secondary Battery>

Figure 1:
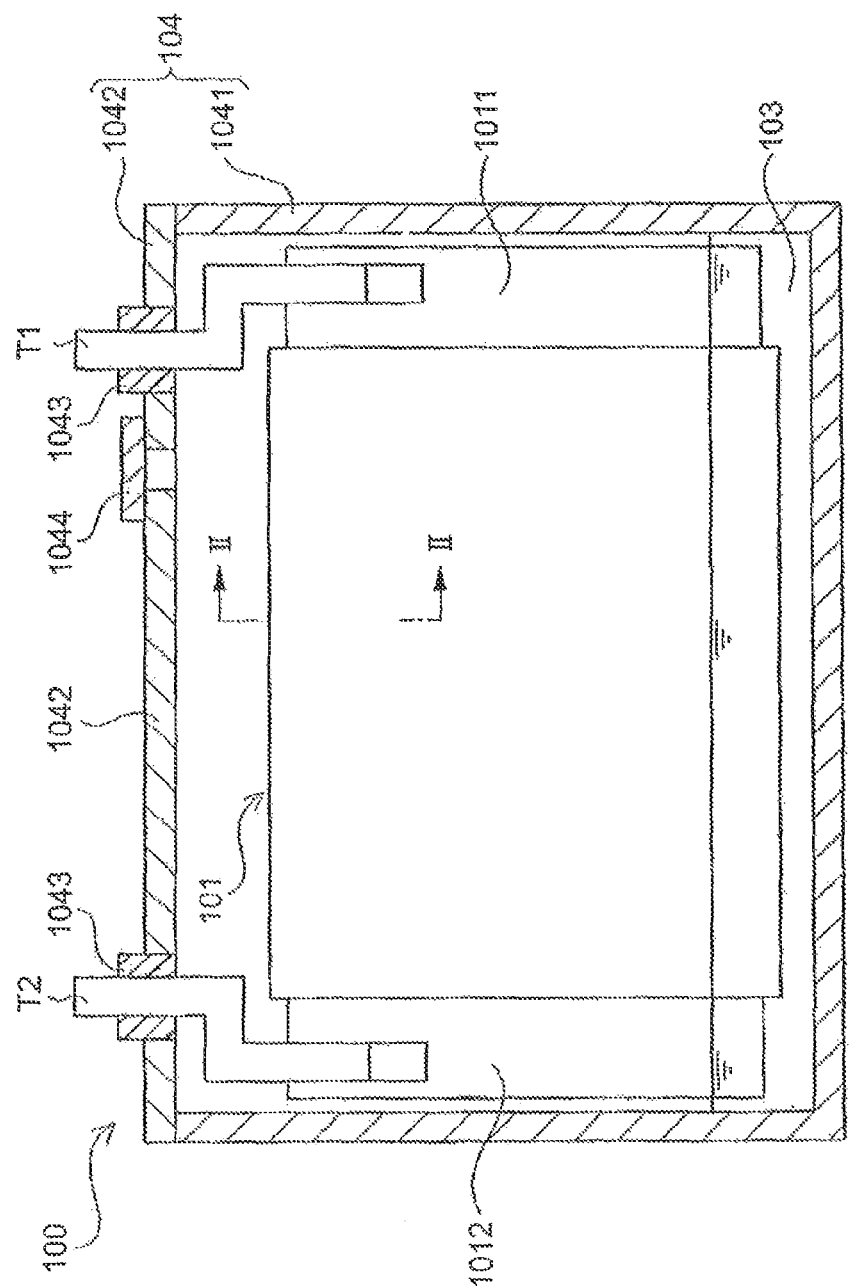
FIG. 1 is a cross-sectional view of a lithium ion secondary battery according to the present embodiment.
Figure 2:
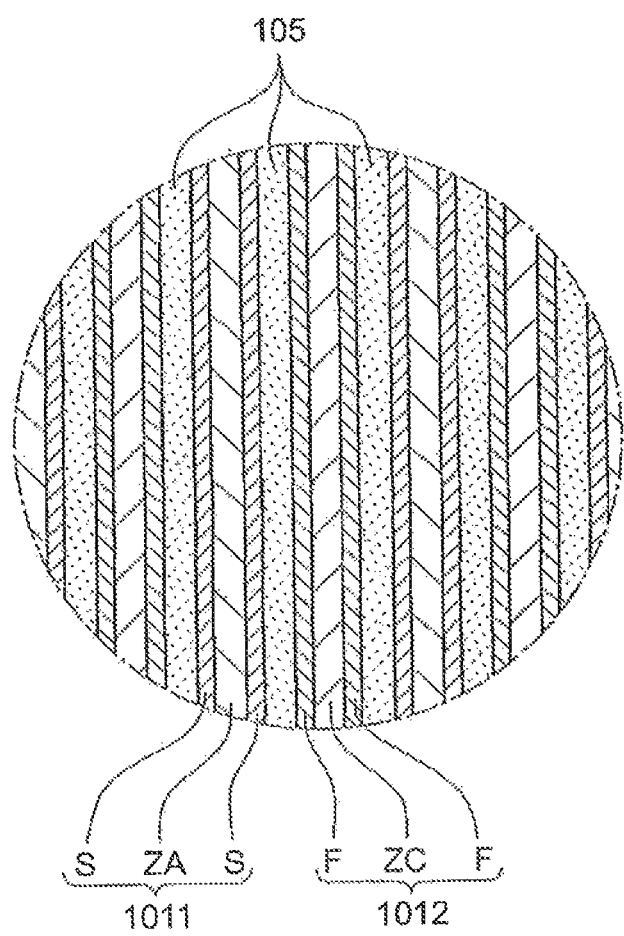
FIG. 2 is a detailed view (enlarged cross-sectional view taken along the II-II line) of the electrode in the lithium ion secondary battery 100 shown in FIG. 1.

First, the structure of the lithium ion secondary battery according to the present embodiment will be explained. FIG. 1 is a cross-sectional view of the lithium ion secondary battery according to the present embodiment. FIG. 2 is a detailed drawing (enlarged cross-sectional view taken along the II-II line) of the electrodes of the lithium ion secondary battery 100 shown in FIG. 1. As shown in FIG. 1, the lithium ion secondary battery 100 includes an electrode body 101, an electrolytic solution 103, and a battery case 104 housing them. The battery case 104 includes a main battery case body 1041 and a sealing plate 1042. The sealing plate 1042 includes an insulating member 1043 and a safety valve 1044.

The electrode body 101 is obtained by fabricating a positive electrode sheet 1011 and a negative electrode sheet 1012 by forming a mix layer in which a positive electrode active material or a negative electrode active material is bonded with a binder or the like on a web-shaped collector Z, sandwiching a separator 105 between the positive electrode sheet 1011 and the negative electrode sheet 1012, winding, and shaping to obtain a flat shape. At the right side in FIG. 1, an external terminal T1 of the positive electrode sheet 1011 protrudes from the sealing plate 1042, and at the left side in FIG. 2, an external terminal T2 of the negative electrode sheet 1012 protrudes from the sealing plate 1042. An electrolytic solution 103 is retained in the lower section of the main battery case body 1041, and the positive electrode sheet 1011 and the negative electrode sheet 1012 are immersed in the electrolytic solution 103.

As shown in FIG. 2, in the positive electrode sheet 1011, a positive electrode mix layer S is formed at each surface of an aluminum foil ZA, which is a positive electrode collector. Meanwhile, in the negative electrode sheet 1012, a negative electrode mix layer F is formed on each surface of a copper foil ZC, which is a negative electrode collector. The positive electrode sheet 1011 and the negative electrode sheet 1012 differ in the active material used therein, but basically have similar structures. Therefore, the method for manufacturing a lithium ion secondary battery according to the present embodiment can be applied to the positive electrode sheet 1011 and the negative electrode sheet 1012.

First Embodiment

Method for Manufacturing Lithium Ion Secondary Battery

A method for forming a mix layer on one surface of the collector, which is a specific technical feature and included in the method for manufacturing a lithium ion secondary battery according to the first embodiment, will be explained below. FIG. 3 shows part of an apparatus for manufacturing a lithium ion secondary battery according to the first embodiment.

As shown in FIG. 3, the apparatus 10 for manufacturing a lithium ion secondary battery according to the first embodiment includes an intaglio gravure roll 1, a liquid pan 2, a backup roll 3, a radiator 4, a powder feeder 5, pressurizing rollers 6, 7, and a conveying roller 8. The intaglio gravure roll 1 is a cylindrical roll that applies a binder coating liquid 21 in a patterned manner on the surface of the collector Z. The collector Z has a thickness of about 20 μm. An intaglio 11 incised according to a predetermined pattern shape is formed at the outer circumferential surface for coating of the cylindrical roll. The pattern shape of the intaglio 11 will be explained below in greater detail. The diameter, hardness, material, and the like of the intaglio gravure roll 1 are selected with consideration for the rigidity necessary during high-speed rotation, wear resistance of the intaglio 11, and the like.

The liquid pan 2 is a container retaining the binder coating liquid 21 for pattern coating by the intaglio gravure roll 1. The binder coating liquid 21 is an aqueous dispersion of SBR. The SBR concentration is 10.0 wt % to 40 wt %. The glass transition temperature of the SBR is −50° C. to 30° C. A thickening agent or a surfactant may be included in the binder coating liquid 21 to adjust the viscosity or wettability of the coating liquid. Publicly available thickening agents and surfactants can be used. In addition to the SBR, a polyacrylic acid (PAA) in an aqueous system or poly(vinylidene fluoride) (PVDF) of an organic solvent system may be used as the binder.

The lower end of the intaglio gravure roll 1 is immersed in the binder coating liquid 21 retained in the liquid pan 2. The binder coating liquid 21 is supplied into the intaglio as the intaglio gravure roll 1 rotates. Above the liquid pan 2, a scraper 12 abuts against the outer circumferential surface of the intaglio gravure roll 1 and scrapes off the excess binder coating liquid 21 that has adhered to the outer circumferential surface in order to prevent the binder coating liquid 21 supplied into the intaglio of the intaglio gravure roll 1 from sagging.

The rubber backup roll 3 is disposed opposite the intaglio gravure roll 1. When the web-shaped collector Z passes through a gap between the intaglio gravure roll 1 and the backup roll 3, the binder coating liquid 21 supplied into the intaglio is applied on the surface on one side of the collector Z. By performing the coating is performed at a constant rate, coated sections ZT and uncoated sections corresponding to the pattern shape of the intaglio are formed on the collector Z. The exposed surface area ratio of the collector Z in the pattern coating process is within a range of about 10% to 85%. The rate of coating on the collector Z is about 30 m/min to 60 m/min. The film thickness of the coated sections ZT is about several microns (preferably 1.5 μm).

The collector Z on which pattern coating has been performed with the binder coating liquid 21 is conveyed, initially vertically and then horizontally, with the conveying roller 8 and then dried with the radiator 4. In the present embodiment, since the glass transition temperature of the SBR, which is the binder, is equal to or higher than −50° C., the low-temperature reaction resistance can be reduced, while increasing the adhesivity, by drying with the radiator 4 to obtain a dry state. When the thickness of the coated sections is small (for example, about 1.5 μm), drying with the radiator 4 can be omitted. This is because the amount of water is small and, therefore, the water can be evaporated in the subsequent powder molding.

The powder feeder 5 is installed at the rear side in the conveying direction adjacently to the radiator 4. The powder feeder 5 is a device for continuously feeding, to a predetermined thickness, a powder 51 of mix particles including an active material and a binder onto the coated sections ZT obtained by performing pattern coating of the binder coating liquid 21. The powder 51 of mix particles is manufactured by using the powdery active material and binder and mixing the powders. The binder used for the mix particles may be of the same type as the binder used for the binder coating liquid, or of a different type. For example, amorphous coat graphite can be used as a negative electrode active material. For example, polytetrafluoroethylene (PTFE) can be used as the binder. The powder 51 of mix particles is obtained by compounding graphite and PTFE at a ratio (wt %) of about 98:2.

The powder 51 of mix particles may be manufactured by dissolving and kneading the active material, binder, and thickening agent in a solvent, drying and granulating. The mixing ratios (wt %) of the active material, binder and thickening agent in this case are about 97.3:2.0:0.7. The deposition amount of the powder 51 of mix particles is about 10 mg/cm$^2$, and the thickness of a deposited layer 52 is about 100 μm to 120 μm.

The collector Z passing by the powder feeder 5 passes between the pressurizing rollers 6, 7. The pressurizing rollers 6, 7 apply a pressure to the deposited layer 52 of the mix that has been deposited by the powder feeder 5 and form a mix layer 53 of a predetermined density. Because of such pressure molding, the binder in the mix layer 53 is closely attached, the peel strength is increased, conductive paths connecting the exposed sections on the collector surface to the active material are formed, and penetration resistance can be reduced. The thickness of the mix layer 53 after the pressurization is about 80 μm.

The pressurizing rollers 6, 7 can also heat the mix layer 53 to about 100° C. to 150° C. The heating increases adhesion between the mix layer 53 and the collector Z and effectively removes impurities such as volatile substances (solvent or humid air) contained in the mix layer 53. With the above-described method for manufacturing a lithium ion secondary battery according to the first embodiment, the mix layer 53 can be formed on one surface of the collector Z in the electrode body 101. In the case where the mix layer 53 is formed on each surface of the collector Z in the electrode body 101, the abovementioned manufacturing method is repeated twice.

<Pattern Shape of Intaglio>

The pattern shape of the intaglio 11 used in the manufacturing method according to the first embodiment will be explained below. FIGS. 4A to 4E show pattern shape examples of the intaglio in the manufacturing apparatus shown in FIG. 3. As shown in FIGS. 4A to 4E, the planar shape of the coated sections on which pattern coating is performed is a dot-like or linear shape, and the length thereof in the direction parallel to the conveying direction of the collector is larger than the length in the direction perpendicular to the conveying direction. The conveying direction is a vertical direction in FIGS. 4A to 4E (the direction shown by an arrow).

FIG. 4A shows an elliptical shape extending in the conveying direction of the collector. The ellipses are arranged equidistantly in transverse rows in the direction perpendicular to the conveying direction. The next transverse row is formed by shifting the positions of the ellipses in a zigzag manner in the conveying direction with respect to those in the previous transverse row. The transverse rows may be at any distance from each other in the conveying direction, provided that the adjacent ellipses to not intersect. The length of the long axis (long diameter) in one elliptical shape is about several tens of microns and preferably 2 to 3 times the length of the short axis (short diameter).

FIG. 4B shows a rhomboidal shape extending in the conveying direction of the collector. The rhombs are arranged equidistantly in transverse rows in the direction perpendicular to the conveying direction. The next transverse row is formed by shifting the position of the rhombs in a zigzag manner in the conveying direction with respect to those in the previous transverse row. The transverse rows may be at any distance from each other in the conveying direction, provided that the adjacent rhombs to not intersect. The length of a diagonal line in the direction parallel to the conveying direction in one rhomboidal shape is preferably about several tens of microns and preferably 2 to 3 times the length of a diagonal line in the orthogonal direction with respect to the conveying direction.

FIG. 4C shows a vertical linear shape parallel to the conveying direction. The width of the vertical lines or the distance between the vertical lines is about several tens of microns. In FIG. 4C, the vertical lines are straight lines, but they may also be curved lines. In FIG. 4C, a distance between the adjacent vertical lines is constant in a longitudinal direction, but the width can also vary in a regular manner.

FIG. 4D shows an inclined linear shape inclined with respect to the conveying direction. The width of the inclined lines or the distance between the inclined lines is about several tens of microns. In FIG. 4D, the inclined lines are straight lines, but they may also be curved lines. In FIG. 4D, the adjacent inclined lines have a constant width, but the width can also vary in a regular manner.

FIG. 4E shows a grid pattern shape in which inclined lines, which are inclined with respect to the conveying direction, intersect. The width of the inclined lines constituting the grid pattern or the distance between the inclined lines is about several tens of microns. Where the width of the inclined lines is equal to or greater than 50 µm, the coating liquid aggregates in the vicinity of corners where the inclined lines intersect and the pattern can be easily disturbed. Therefore, it is preferred that the width of the inclined lines be about 10 µm to 40 µm. In FIG. 4E, the inclined lines constituting the grid pattern are straight lines, but they may also be curved lines. In FIG. 4E, the adjacent inclined lines constituting the grid pattern have a constant width, but the width can also vary in a regular manner.

FIGS. 4A to 4E show the preferred examples of the pattern shape of the intaglio gravure, but those shapes are not necessarily limiting. For example, the elliptical shapes may be formed continuously in the conveying direction, and the elliptical shapes and rhomboidal shapes may be combined. In the first embodiment described hereinabove, the length of the planar shape of the coated sections in the direction parallel to the conveying direction of the collector is larger than the length in the direction perpendicular to the conveying direction. Therefore, escape routes for the air are formed in the direction parallel to the conveying direction, and the air is unlikely to be enclosed in the intaglio of the gravure roll. As a result, the binder coating liquid located in the intaglio is accurately transferred to the collector surface.

<Mechanism of Peel Strength and Penetration Resistance of Mix Layer>

Figure 5:
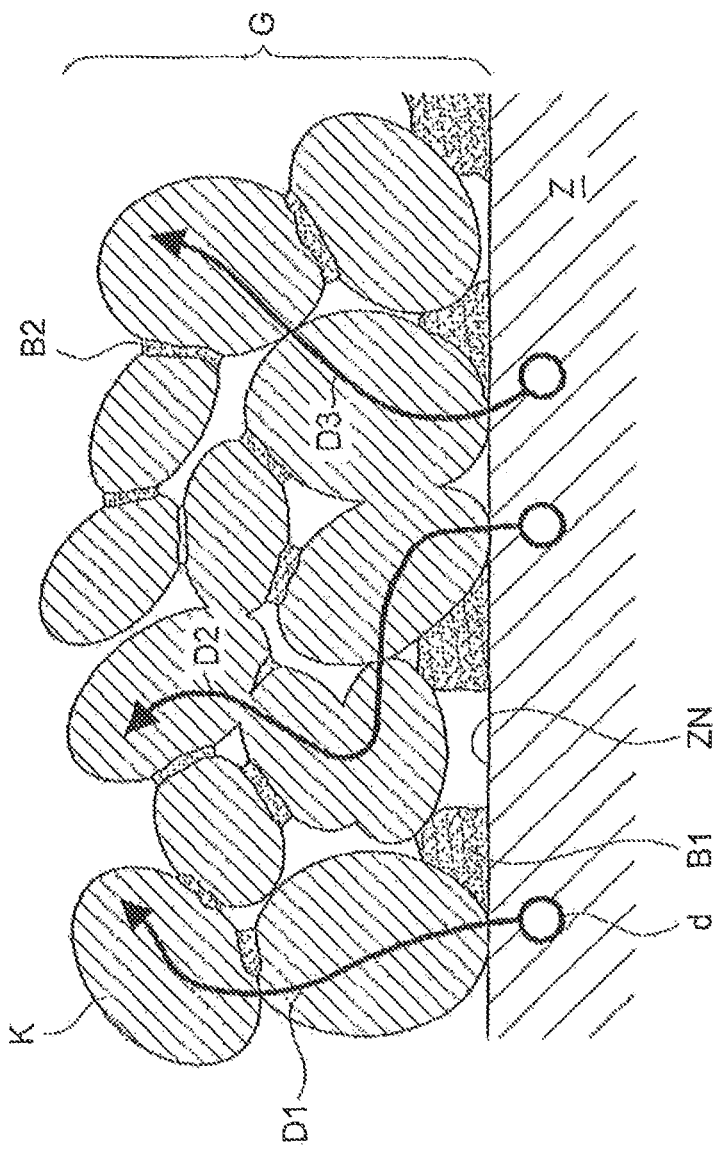
FIG. 5 is a schematic cross-sectional view of the mix layer according to the first embodiment.
Figure 6:
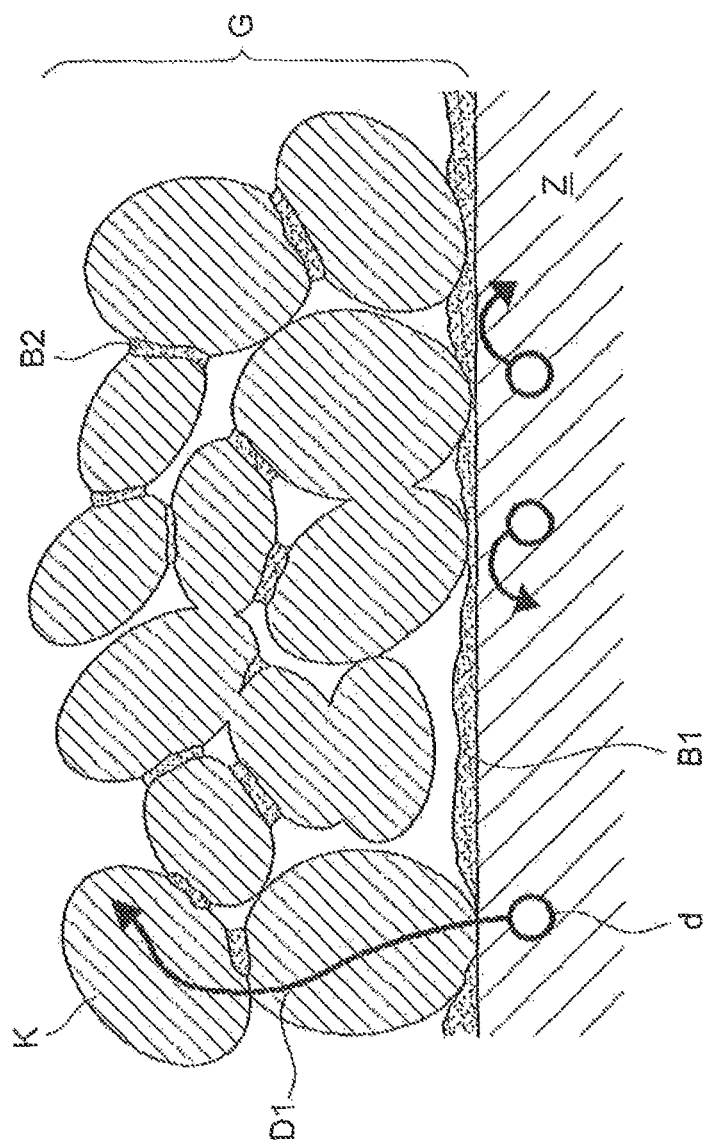
FIG. 6 is a schematic cross-sectional view of the mix layer in the case in which the exposed surface area ratio of the collector is less than 10%.

Described below is the mechanism ensuring the peel strength and penetration resistance of the mix layer in the electrode sheet of the lithium ion secondary battery manufactured by the manufacturing method according to the first embodiment. FIG. 5 is a schematic cross-sectional view of the mix layer according to the first embodiment. FIG. 6 is a schematic cross-sectional view of the mix layer in the case in which the exposed surface area ratio of the collector is less than 10%.

As shown in FIG. 5, a binder B1 is coated with a predetermined width on the surface of the collector Z by the pattern coating, and the coated sections of the binder B1 are formed discontinuously. The surface ZN of the collector Z that is not coated with the binder B1 constitutes the uncoated sections (exposed sections). A particulate active material K is deposited together with a particulate binder B2 on the coated sections and the uncoated sections of the binder B1. Where the deposited layer of the active material K and the binder B2 is pressurized by the pressurizing rollers, part of the active material K is bonded to the surface of the collector Z by the binder B1 of the coated sections. Another part of the active material K is directly closely attached to the uncoated sections (exposed sections) of the collector Z.

Therefore, the active material K is bonded by the binder B1 on the collector Z, and the peel strength of the collector Z and the binder K is increased. At the same time, the active material K is directly closely attached to the collector Z, and a large number of conductive paths D1 to D3 for conduction electrons d is formed.

Further, where the particles of the active material K are closely attached to each other by pressurization with the pressurizing rollers, the particulate binder B2 interposed in the gaps therebetween is collapsed, and part of the active material K is bonded to the adjacent active material K by the collapsed binder B2. Another part of the active material K is closely attached to the adjacent active material K directly, rather than by the particulate binder B2. Therefore, the layered particles of the active material K are bonded to each other by the binder B2 and the peel strength is increased. At the same time the particles of the active material K are directly loosely attached to each other and the conductive paths D1 to D3 formed thereby reach the upper end of a mix layer G. Since a large number of such conductive paths D1 to D3 is formed from the surface of the collector Z to the upper end of the mix layer G, the penetration resistance of the electrode sheet can be reduced.

Therefore, with the manufacturing method according to the first embodiment, the appropriate peel strength and penetration resistance of the mix layer G in the electron sheet of the manufactured lithium ion secondary battery can be ensured at the same time. Further, as shown in FIG. 6, when the exposed surface area ratio of the collector is made less than 10%, most of the active material K is bonded to the surface of the collector Z by the binder B1 of the coated sections. Even when the deposited layer of the active material K and the binder B2 is pressurized by the pressurizing rollers, the binder B1 remains as a thin film in a large portion between the collector Z and the active material K. Since the binder B1 is by itself an insulator, the formed conductive path D1 is restricted to tiny remaining exposed portion. As a result, the peel strength of the mix layer G is ensured, but the penetration resistance increases. Therefore, in order to ensure a better combination of the peel strength and penetration resistance in the mix layer G in the electron sheet of the lithium ion secondary battery, it is preferred that the exposed surface area ratio of the collector be equal to or greater than 10%, and it is even more preferred that the exposed surface area ratio of the collector be within a range of about 50% to 70%.

<Relationship Between Exposed Surface Area Ratio of Collector and Low-Temperature Reaction Resistance>

Figure 7:
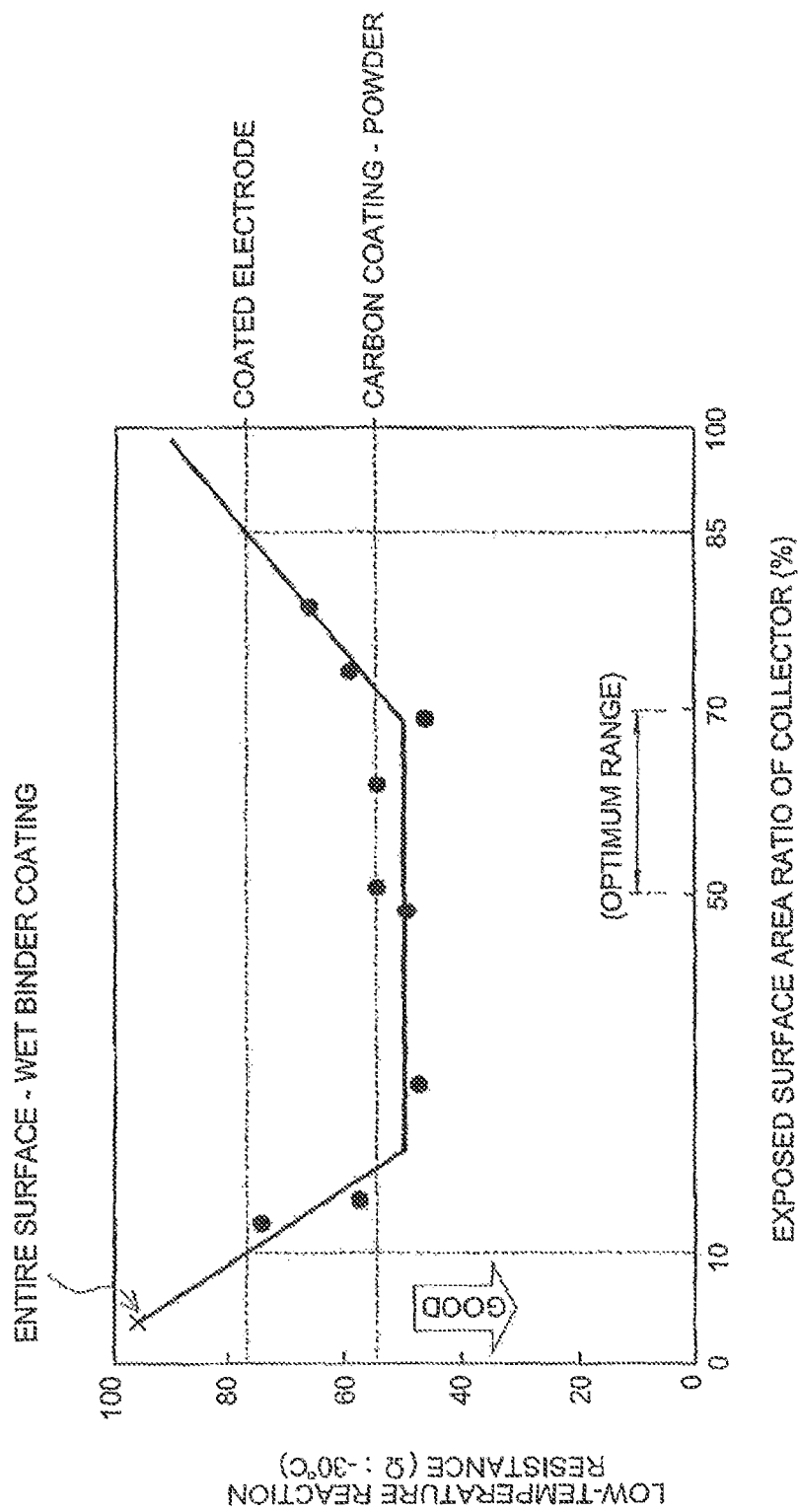
FIG. 7 is a graph illustrating the relationship between the exposed surface area ratio of the collector and the low-temperature reaction resistance in the negative electrode according to the first embodiment.

The relationship between the exposed surface area ratio of the collector and a low-temperature reaction resistance in the electrode sheet of the lithium ion secondary battery manufactured by the manufacturing method according to the first embodiment will be explained below. FIG. 7 is a graph illustrating the relationship between the exposed surface area ratio of the collector and a low-temperature reaction resistance in the negative electrode sheet according to the first embodiment. The results plotted in FIG. 7 are obtained by changing the pattern shape of the intaglio gravure, increasing gradually the exposed surface area ratio of the collector, and measuring the low-temperature reaction resistance at −30° C. in the mix layer of the electrode sheet formed at this time. FIG. 7 illustrates the behavior of the results.

As shown in FIG. 7, when the exposed surface area ratio of the collector in the electrode sheet of the lithium ion secondary battery manufactured by the manufacturing method according to the first embodiment is within a range of about 10% to 85%, the low-temperature reaction resistance at −30° C. can be made less than that in the conventional coated electrode. The conventional coated electrode as referred to herein is an electrode manufactured by kneading an active material and a binder in a solvent, applying the resultant slurry-like paste on the collector surface to obtain a thin film, and then performing drying and pressing.

When the exposed surface area ratio of the collector is about 10%, the low-temperature reaction resistance at −30° C. is at a substantially the same level as in the conventional coated electrode, but as the exposed surface area ratio of the collector increases from about 10%, the low-temperature reaction resistance at −30° C. further decreases. Within a range of the exposed surface area ratio of the collector of about 20% to 70%, the low-temperature reaction resistance at −30° C. decreases by about 30% with respect to that in the conventional electrode, reaches substantially the same level as in a carbon coating—powder electrode obtained by layering and pressurizing the powder of mix particles on a collector coated with carbon, and is stabilized at a substantially constant level.

As the exposed surface area ratio of the collector rises from about 70%, the low-temperature reaction resistance at −30° C. increases gradually. When the exposed surface area ratio of the collector is about 85%, the low-temperature reaction resistance at −30° C. is at a substantially the same level as in the conventional coated electrode. In this case, the low-temperature reaction resistance apparently increases because part of the mix layer slides off due to shocks occurring when the formed electrode sheet is cut to a necessary size. Therefore, in order to stabilize further the low-temperature reaction resistance at −30° C. and maintain it at a low level, it is preferred that the exposed surface area ratio of the collector be within a range of about 50% to 70%.

<Effect of Glass Transition Temperature of Pattern-Coating Binder>

The effect of the glass transition temperature of the pattern-coating binder is described below. The pattern-coating binder, as referred to herein, has the same meaning as the binder used for the binder coating liquid. Generally, where the binder is finally dried, the adhesivity is unlikely to be demonstrated. Therefore, even when the deposited layer of the active material and the binder is pressure molded after the binder has been dried, the necessary peel strength cannot be obtained.

For this reason, the deposited layer of the active material and the binder is pressurized in a wet state before the binder is dried. However, when the deposited layer of the active material and the binder is pressure molded in the wet state of the binder, the binder also expands and, therefore, causes the increase in penetration resistance. Accordingly, tests conducted by the inventors with binders of different types demonstrated that where the glass transition temperature of the binder is equal to or higher than −50° C., high adhesion between the collector and the active material can be obtained and excellent battery performance is attained when the deposited layer of the active material and the binder is pressure molded even after the binder has been dried. Where the glass transition temperature of the binder is equal to or less than 30° C., the peel strength in a dry state of the binder can be increased.

Figure 8:
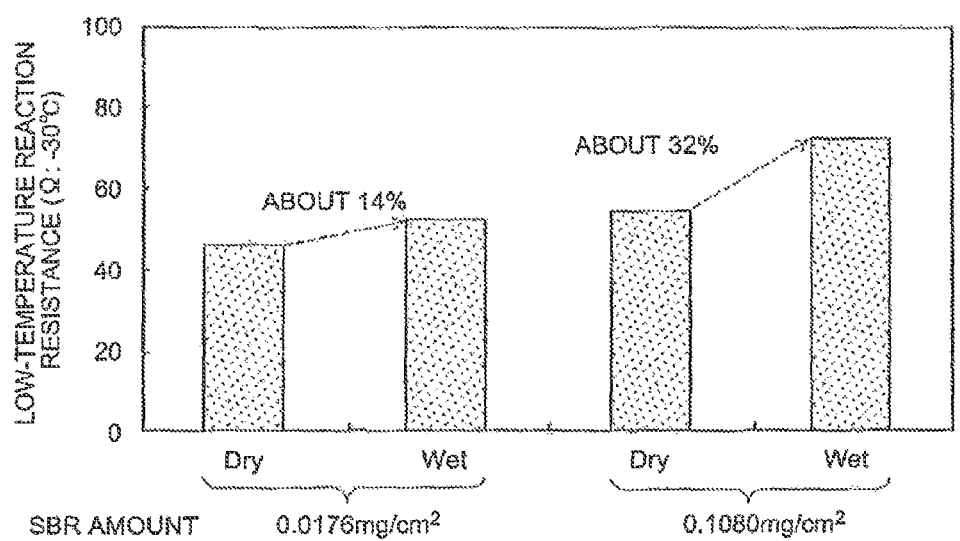
FIG. 8 is a graph illustrating the effect produced by the content of the pattern-coating binder and the difference between the dry state and wet state on low-temperature reaction resistance in the negative electrode sheet of the first embodiment.

FIG. 8 shows a graph relating to the effect produced by the difference between the dry and wet states on the low-temperature reaction resistance at −30° C. in the case of a small content of the binder for pattern coating in the negative electrode according to the first embodiment. The binder in this case is an SBR with a glass transition temperature within a range of −50° C. to 30° C. The content of the SBR in the coating liquid is of two types, namely, 0.0176 mg/cm$^2$ and 0.1080 mg/cm$^2$. As shown in FIG. 8, when the content of the binder is 0.0176 mg/cm$^2$, the difference in low-temperature reaction resistance at −30° C. between the dry and wet states is about 14%, and the effect produced by the dry and wet state is not that large.

By contrast, where the content of the binder is 0.1080 mg/cm$^2$, the difference in low-temperature reaction resistance at −30° C. is about 32%, and the effect produced by the dry and wet state is rather large. Further, in the dry state, the low-temperature reaction resistance at −30° C. can be reduced to a substantially the same level as that in the abovementioned carbon coating-powder electrode. Thus, it has been established that even when the content of the pattern-coating binder is small (for example, 0.1080 mg/cm$^2$), where the glass transition temperature of the binder is equal to or higher than −50° C., high adhesion between the collector and the active material can be obtained and excellent battery performance is demonstrated when the deposited layer of the active material and the binder is pressure molded even after the binder has been dried.

Second Embodiment

Method for Manufacturing Lithium Ion Secondary Battery

Figure 9:
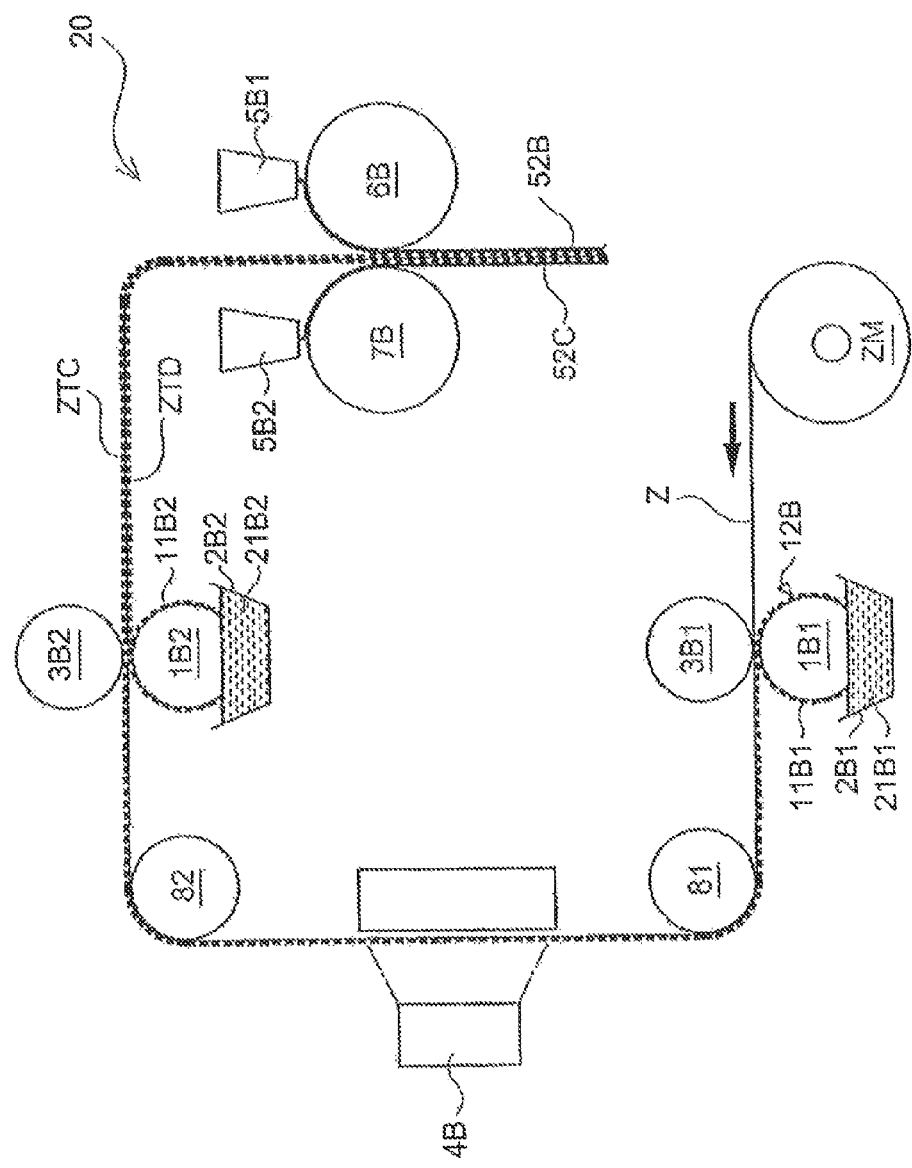
FIG. 9 shows part of the apparatus for manufacturing the lithium ion secondary battery according to the second embodiment.

A method for forming a mix layer on both surfaces of the collector, which is a specific technical feature and included in the method for manufacturing a lithium ion secondary battery according to the second embodiment, will be explained below. FIG. 9 shows part of an apparatus for manufacturing a lithium ion secondary battery according to the second embodiment. The method for manufacturing a lithium ion secondary battery according to the second embodiment is similar to that of the first embodiment, with the exception of the features relating to the method for forming a mix layer on both surfaces of the collector, such as the pattern shape of the intaglio gravure. The detailed description is omitted herein.

As shown in FIG. 9, an apparatus 20 for manufacturing a lithium ion secondary battery according to the second embodiment is provided with a first intaglio gravure roll 1B1, a second intaglio gravure roll 1B2, a first liquid pan 2B1, a second liquid pan 2B2, a first backup roll 3B1, a second backup roll 3B2, a heat radiator 4B, a first powder feeder 5B1, a second powder feeder 5B2, pressurizing rollers 6B, 7B, and guide rolls 81, 82.

The first intaglio gravure roll 1B1 and the second intaglio gravure roll 1B2 are cylindrical rolls for performing pattern coating of the binder coating liquid 21 on the surface of the collector Z. The outer circumferential side in the feed direction of the collector Z fed from a coil unwinding machine ZM of the collector Z is applied by pattern coating by the first intaglio gravure roll 1B1, and the inner circumferential side in the feed direction of the collector Z is applied by pattern coating by the second intaglio gravure roll 1B2. The pattern shapes of intaglios 11B1, 11B2 are the same as those of the first embodiment.

The first liquid pan 2B1 and the second liquid pan 2B2 are the containers retaining binder coating liquids 21B1, 21B2 to be applied by pattern coating by the intaglio gravure rolls 1B1, 1B2, respectively. The binder coating liquids 21B1, 21B2 are aqueous SBR dispersions. The SBR concentration and glass transition temperature are the same as in the first embodiment. The first backup roll 3B1 and the second backup roll 3B2 are disposed opposite the first intaglio gravure roll 1B1 and the second intaglio gravure roll 1B2. Because the second backup roll 3B2 applies a pressure to the outer circumferential side in the feed direction of the collector Z that has already been applied by pattern coating, and although drying is performed with the heat radiator 4B, a non-sticking roll is used. Coated sections ZTC, ZTD and uncoated sections corresponding to the intaglio pattern shape are regularly formed at both surfaces on the outer circumferential side and inner circumferential side in the feed direction of the collector Z. The exposed surface area ratio of the collector in the coating process is within a range of about 10% to 85%. The rate of coating on the collector Z is about 30 m/min to 60 m/min. The film thickness of the coated sections is about 1.5 µm.

After the pattern coating has been performed on both surfaces on the outer circumferential side and inner circumferential side in the feed direction of the collector Z, a powder including an active material and a binder in a particulate form is layered by the first powder feeder 5B1 and the second powder feeder 5B2 on the pressurizing rollers 6B, 7B. The pressurizing rollers 6B, 7B are disposed at opposing positions, with the collector Z being interposed therebetween, and roll while pressurizing the layered deposited layer to the collector Z, and form mix layers 52B, 52C on both surfaces of the collector Z.

As described hereinabove, with the method for manufacturing a lithium ion secondary battery according to the second embodiment, the mix layers 52B, 52C are simultaneously formed at both surfaces of the collector Z, thereby further increasing the production efficiency. Furthermore, if the mix layer on both surfaces of the collector is formed by a method for forming a mix layer on one side of a collector, as in the first embodiment, the mix layer that has been heretofore formed is re-pressurized by the pressurizing roller when another mix layer is formed thereafter. In this case, the active material of the re-pressurized mix layer can be deformed or degraded. This is effectively prevented in the method for manufacturing a lithium ion secondary battery according to the second embodiment.

Third Embodiment

Figure 10:
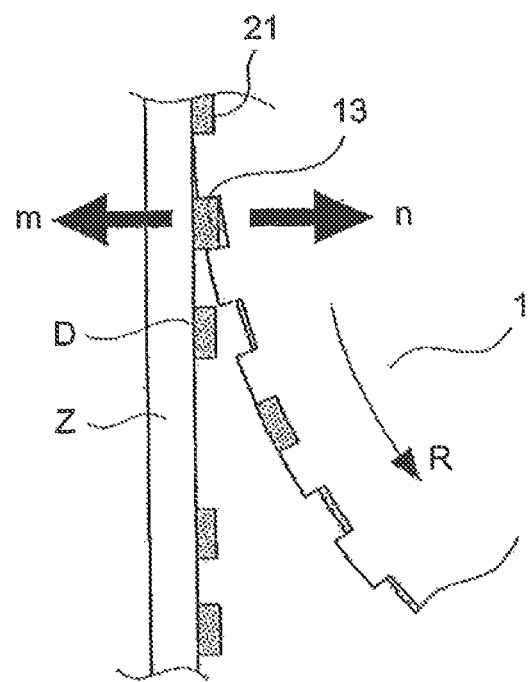
FIG. 10 is a schematic diagram explaining how the intaglio gravure roll is incised with dot-shaped depressions and the binder coating liquid is applied on the collector.
Figure 11:
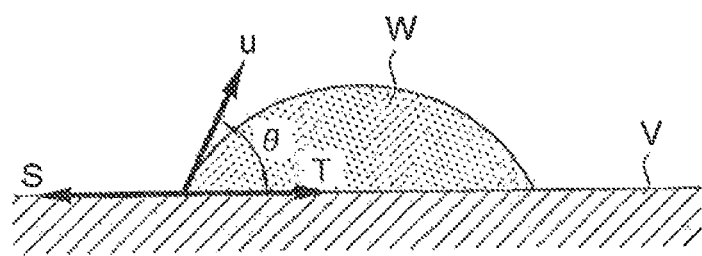
FIG. 11 is a cross-sectional view showing the tangent angle of a liquid drop when the liquid is dropped on a solid surface.
Figure 13:
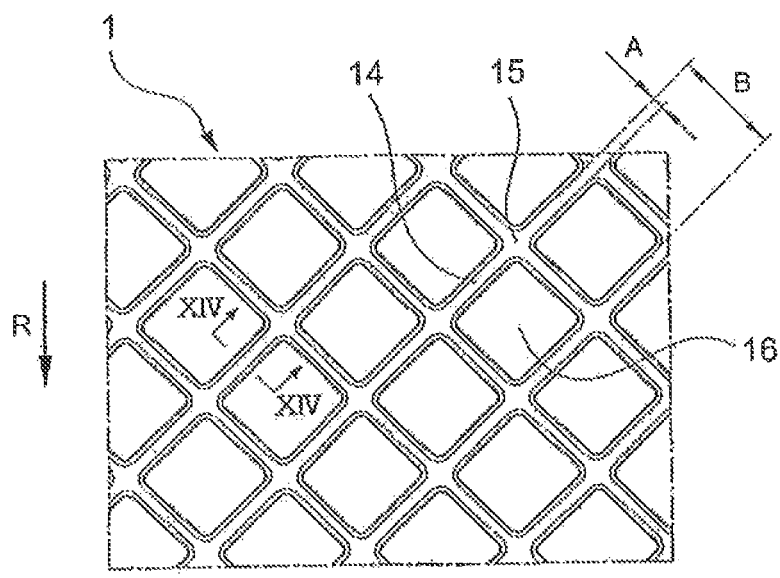
FIG. 13 is a top view of the grooved depression according to the third embodiment.
Figure 14:
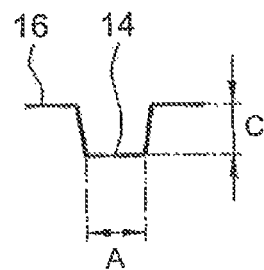
FIG. 14 is a cross-sectional view taken along the XIV-XIV line shown in FIG. 13.
Figure 15:
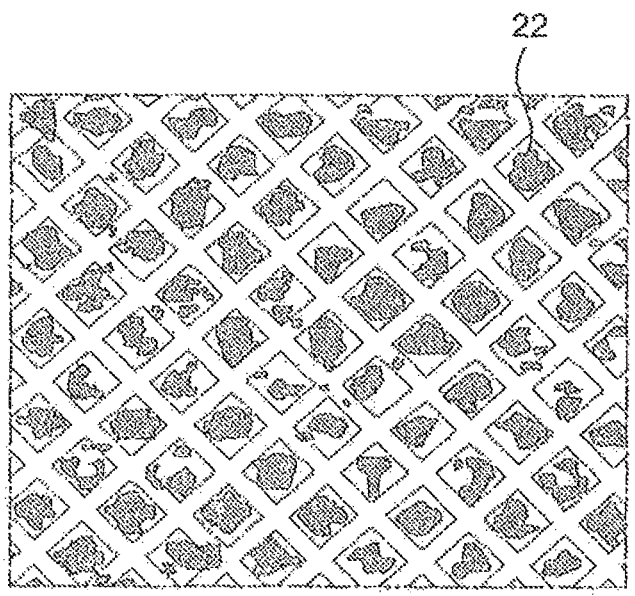
FIG. 15 is a schematic top view of the dot-shaped coated section in the case in which the groove width for the grooved depressions is 10 μm.
Figure 16:
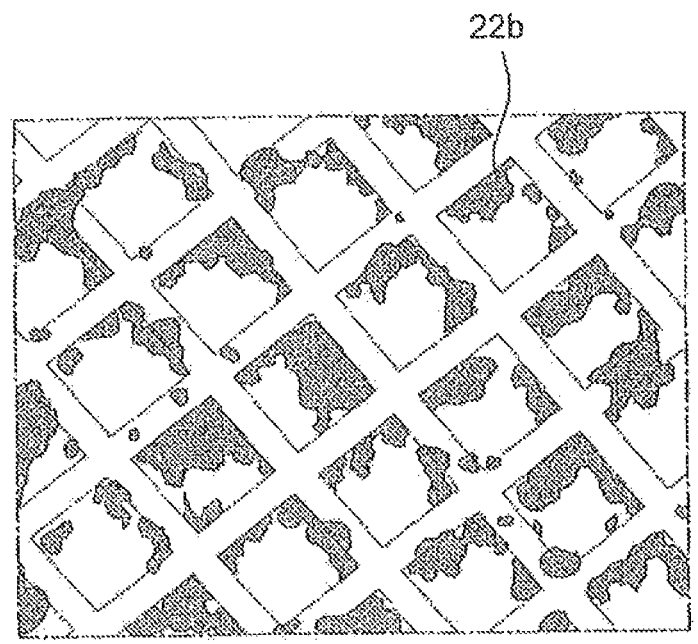
FIG. 16 is a schematic top view of the dot-shaped coated section in the case in which the groove width for the grooved depressions is 20 μm.
Figure 17:
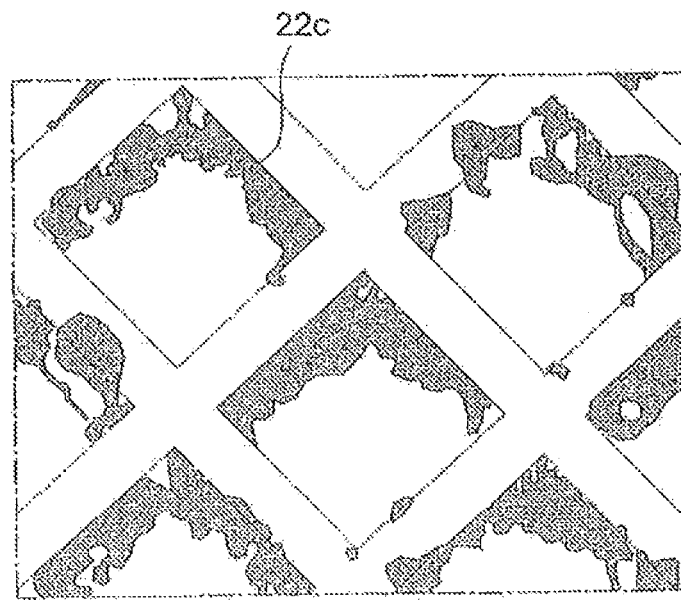
FIG. 17 is a schematic top view of the dot-shaped coated section in the case in which the groove width for the grooved depressions is 40 μm.

Explained below as a third embodiment is a binder coating process in which an intaglio gravure roll to be used in intaglio gravure coating is incised with groove-shaped depressions having intersections where the grooves intersect with each other, the binder coating liquid supplied to the groove-shaped depressions shrinks to the intersections, and dot-shaped coated sections are formed on the collector. FIG. 10 is a schematic diagram illustrating how the intaglio gravure roll is incised with dot-shaped depressions and the binder coating liquid is applied on the collector. FIG. 11 is a cross-sectional view illustrating the contact angle of a liquid droplet when a liquid is dropped on a solid surface. FIGS. 12A to 12D are schematic diagrams illustrating how the binder coating liquid in groove-shaped depressions having intersections where the grooves intersect with each other shrinks toward the intersections. FIG. 13 is a top view of the groove-shaped depressions according to the third embodiment. FIG. 14 is a cross-sectional view taken along the XIV-XIV line in FIG. 13. FIG. 15 is a schematic top view of the dot-shaped coated sections in the case in which the groove width of the groove-shaped depression is 10 µm. FIG. 16 is a schematic top view of the dot-shaped coated sections in the case in which the groove width of the groove-shaped depression is 20 µm. FIG. 17 is a schematic top view of the dot-shaped coated sections in the case in which the groove width of the groove-shaped depression is 40 µm. This binder coating process can be applied to the above-described method for manufacturing a lithium ion secondary battery according to the first embodiment and method for manufacturing a lithium ion secondary battery according to the second embodiment.

<Revolutionary Idea of Forming Dot-Shaped Coated Sections>

The experiments conducted by the inventors have demonstrated that where dot-shaped coated sections, such as in the round or rhomboidal pattern, are formed when intaglio gravure coating of the binder coating liquid is performed on the collector, high peel strength of the mix layer and low penetration resistance of the collector sheet are obtained. However, the problem arising when the intaglio gravure roll 1 is incised with dot-shaped depressions 13 in order to form dot-shaped coated sections D on the collector Z, as shown in FIG. 10, is that air easily penetrates into the dot-shaped depressions 13, whereas the binder coating liquid 21 can hardly penetrate thereinto. Another problem is that since the dot-shaped depressions 13 surround the binder coating liquid 21 from all sides by the wall surfaces and have high liquid retention ability, the binder coating liquid 21 is stretched in the directions shown by arrows m and n, stays in the dot-shaped depressions 13 and is unlikely to be transferred to the collector Z. Based on the results obtained by a trial-and-error method, the inventors came up with a revolutionary idea of incising the intaglio gravure roll 1 with a plurality of groove-shaped depressions having intersections in which the grooves intersect with each other, rather than by incising the intaglio gravure roll 1 with the dot-shaped depressions 13, and forming the coated sections, which have been transferred onto a collector, in a dot-like shape by using the shrinkage of the binder coating liquid supplied to the groove-shaped depressions toward the intersections in order to form the dot-shaped coated sections D on the collector Z.

<Mechanism of Forming Dot-Shaped Coated Sections>

The mechanism of forming the dot-shaped coated sections that has brought forth this revolutionary idea will be explained below. As shown in FIG. 11, a liquid drop W formed when a liquid has dropped on a solid body V generally has an ability of being hemispherically rounded by the surface tension thereof. Where the surface tension of the solid body is denoted by S, the surface tension of the liquid is denoted by U, and the interfacial tension between the solid body and the liquid is denoted by T, the following equation is valid:

$$S = U \times \cos\theta + T \qquad (1).$$

Equation (1) is called "Young's equation". The angle θ between the tangent of a liquid drop to the solid surface and the solid surface is called "contact angle" and serves as an indicator of wettability of the liquid with respect to the solid surface. Where the contact angle θ decreases, wettability increases and the liquid drop flattens and is unlikely to shrink, but where the contact angle θ increases, wettability decreases and the liquid drop bulges and can easily shrink. Equation (1) also indicates that where the interfacial tension T between the solid surface and the liquid is decreased, the contact angle θ increases. The interfacial tension T between the solid surface and the liquid can be decreased by reducing the surface area of contact between the liquid and the solid surface. Assuming that, where the wall surface of the depressions incised on the intaglio gravure roll is opened in one direction, the interfacial tension T of the supplied binder coating liquid decreases in this direction, the contact angle θ increases, and the liquid can be induced to shrink in that direction.

Figure 12:
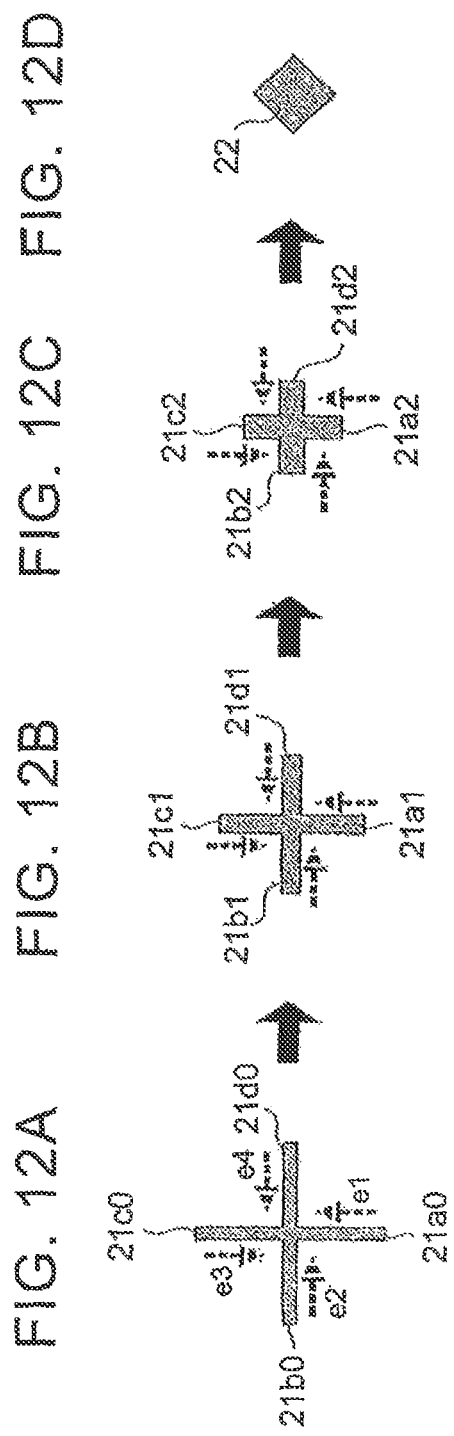
FIGS. 12A to 12D are schematic diagrams explaining how the binder coating liquid located inside the groove-shaped depressions having an intersection where the grooves intersect with each other shrinks toward the intersection.

FIGS. 12A to 12D are image diagrams illustrating how the binder coating liquid is supplied to groove-shaped depressions having an intersection where the grooves intersect with each other, and how the binder coating liquid supplied in a cross-like manner, with the intersection being a center, shrinks toward the intersection. FIG. 12A shows the stage before the binder coating liquids 21a0 to 21d0 supplied in a cross-like manner, with the intersection being a center, shrink. The binder coating liquids 21a0 to 21d0 are in a state in which the liquid width is equal to the groove width of the groove-shaped depressions and the binder coating liquids fully extend in the extension direction of the groove-shaped depressions. In the groove-shaped depressions, the groove is open in the extension direction. For this reason, the interfacial tension acting upon the binder coating liquids 21a0 to 21d0 in the extension direction of the groove-shaped depressions decreases. Therefore, forces e1 to e4 causing the liquids to shrink toward the intersection act upon the binder coating liquids 21a0 to 21d0. FIGS. 12B and 12C show the state in which the binder coating liquids 21a1 to 21d1 and 21a2 to 21d2 supplied in a cross-like manner are shrinking toward the intersection. The length of the binder coating liquids 21a1 to 21d1 and 21a2 to 21d2 decreases as the liquid width increases in the course of shrinking. FIG. 12D shows the state in which the binder coating liquid 22 supplied in a cross-like manner finally shrinks to aggregate in the intersection and a dot-shaped lump is formed. The binder coating liquid 22 that has aggregated in the intersection and formed the dot-shaped lump is transferred as a dot-shaped coated section on the collector. In this case, since the surrounding wall surfaces are not present in the intersection, the ability of the intersection to retain the binder coating liquid 22 is decreased by comparison with that in other sections. Therefore, the binder coating liquid 22 is reliably transferred as a dot-shaped coated section on the collector.

<Groove-Shaped Depressions of Intaglio Gravure Roll>

The intaglio shape of the intaglio gravure roll 1 used for the intaglio gravure coating realizing the coating principle (mechanism) of forming the above-described dot-shaped coated sections will be explained below. As shown in FIG. 13, the intaglio gravure roll 1 used for the intaglio gravure coating is incised in a grid-shape manner with a plurality of groove-shaped depressions 14 having intersections 15 where the grooves intersect with each other. The groove-shaped depressions 14 have predetermined groove width A and groove depth C. In the groove-shaped depressions 14, the linear grooves are formed with a predetermined groove pitch B. A flat protruding section 16 is formed between the mutually adjacent groove-shaped depression 14 and groove-shaped depression 14. In the intersections 15 where the grooves intersect with each other, rounded corners are formed at the protruding sections 16. With consideration for air release, the groove-shaped depressions 14 are formed with an inclination of about 45 degrees with respect to the rotation direction R of the intaglio gravure roll 1. With consideration for liquid release, the groove width of the groove-shaped depressions 14 is slightly larger at the upper end than at the lower end. In the configuration shown in FIG. 13, grid-shape grooves are formed in which two groove-shaped depressions 14 intersect at a right angle, but the intersection angle should not necessarily be a right angle and may be any angle. Radial grooves may be also formed such that two or more groove-shaped depressions 14 intersect radially.

For example, the groove-shaped depressions 14 are preferably shaped such that grooves with a groove width A of 10 μm to 15 μm, a groove pitch B of 23 μm to 40 μm, and a groove depth C of 5 μm to 20 μm are formed in a grid-shape pattern. Further, the contact angle formed between the tangent of the liquid drop to the collector surface and the collector surface when the binder coating liquid is dropped on the collector is preferably equal to or greater than 50 degrees. A groove width A of 10 μm to 15 μm is selected for the groove-shaped depressions 14 because where the groove width A is less than 10 μm, the binder coating liquid partially segregates and coated sections of uniform size are difficult to form. Where the groove width A exceeds 15 μm, the liquid shrinks along the wall surface and a constant dot shape is difficult to form. A groove pitch B of 23 μm to 40 μm is selected because where the groove pitch B is less than 23 μm, and adjacent binder coating liquids coalesce and coated sections of uniform size are difficult to form. Where the groove pitch B exceeds 40 μm, the dot shape of the shrinking liquid becomes uneven. A groove depth C of 5 μm to 20 μm is selected because where the groove depth C is less than 5 μm, the necessary Wet film thickness cannot be obtained, and where the groove depth C exceeds 20 μm, the liquid retention ability increases and it is highly probable that part of the binder coating liquid will not be transferred.

Further, the contact angle formed between the tangent of the liquid drop to the collector surface and the collector surface when the binder coating liquid is dropped on the collector is set to be equal to or greater than 50 degrees because where the contact angle is less than 50 degrees, wettability of the binder coating liquid increases and the binder coating liquid is unlikely to shrink to the intersections of the groove-shaped depressions. Where a thickening agent (for example, CMC) is added to the binder coating liquid, the contact angle tends to increase, and where a surfactant is added, the contact angle tends to decrease. Therefore, the liquid shrinkage can be increased and coated sections of a uniform dot shape can be formed by adding a predetermined amount (about 0.2 wt % to 0.4 wt %) of CMC to the binder coating liquid.

By using a trial-and-error approach, the inventors have experimentally discovered that from the standpoint of obtaining a Wet film thickness of 1.0 μm to 6.0 μm prior to drying (target value 1.5 μm), it is preferred that the groove-shaped depressions incised on the intaglio gravure roll that is used for the intaglio gravure coating process be formed in a grid-shape pattern with a groove width of 10 μm to 15 μm, a groove pitch of 23 μm to 40 μm, and a groove depth of 5

μm to 20 μm and that the contact angle formed between the tangent of the liquid drop to the collector surface and the collector surface when the binder coating liquid is dropped on the collector be equal to or greater than 50 degrees.

<Examples of Dot-Shaped Coated Sections>

Examples of the dot-shaped coated sections formed on the collector by using the groove-shaped depressions of the above-described intaglio gravure roll 1 will be explained below. FIG. 15 is a top view showing schematically a scanning electron microscope (SEM) image of the collector where the binder coating liquid 22 is coated in a dot shape in the case in which the groove-shaped depressions are formed to have a groove width of 10 μm, a groove pitch of 23 μm, and a groove depth of 5 μm. As shown in FIG. 15, the dot-shaped coated sections are mostly formed to a substantially constant size. Further, the coalescence and partial segregation of the adjacent binder coating liquid 22 is not observed. Therefore, the dot-shaped coated sections are uniformly formed on the collector.

FIG. 16 is a top view showing schematically a SEM image of the collector where the binder coating liquid 22b is coated in a dot shape in the case in which the groove-shaped depressions are formed to have a groove width of 20 μm, a groove pitch of 40 μm, and a groove depth of 5 μm. As shown in FIG. 16, the size of the binder coating liquid 22b is less uniform than that of the binder coating liquid 22 shown in FIG. 15. This is apparently because where the groove width and groove pitch increase, the binder coating liquid that has formed a single lump is divided and island-like shrunk.

FIG. 17 is a top view showing schematically a SEM image of a coated section 22c formed on the collector in the case in which the groove-shaped depressions are formed to have a groove width of 40 μm, a groove pitch of 40 μm, and a groove depth of 5 μm. As shown in FIG. 17, the dot-shaped coated sections 22c are curved in a hook-like shape, as compared with the dot-shaped coated sections 22 shown in FIG. 15. This is apparently because where the groove width further increases, the binder coating liquid that has formed a single lump shrinks along the wall surface.

As described hereinabove, where the groove width and groove pitch increase when the groove depth is as small as about 5 μm, the liquid is unlikely to shrink uniformly to the intersections, and the dot-shaped coated sections can be formed with a spread in size on the collector. However, it has been confirmed that the shrinking of liquid in this case can be improved by increasing the groove depth to about 20 μm. The effectiveness of the method of incising the intaglio gravure roll with a plurality of groove-shaped depressions having intersections in which the grooves intersect with each other, rather than by incising the intaglio gravure roll with the dot-shaped depressions, and forming the coated sections, which have been transferred onto a collector, in a dot-like shape by using the shrinkage of the binder coating liquid held in the groove-shaped depressions toward the intersections in order to form the dot-shaped coated sections D on the collector Z has thus been confirmed.

The embodiments of the invention can be used as a method for manufacturing a lithium ion secondary battery to be carried on an electric automobile or a hybrid automobile.

What is claimed is:

1. A method for manufacturing a lithium ion secondary battery having electrodes in which a mix layer including a first binder and one of a positive electrode active material and a negative electrode active material is formed via a second binder on a collector, the method comprising:
   performing pattern coating of a binder coating liquid including the second binder on a surface of the collector to regularly form binder-coated sections and uncoated sections no the collector; and
   feeding a dry powder of mix particles including the positive electrode active material or the negative electrode active material and the first binder on the binder-coated sections and the uncoated sections so as to form the mix layer on the collector,
   wherein:
      the pattern coating is performed by intaglio gravure coating,
      an intaglio gravure roll incised with a plurality of groove-shaped depressions having intersections where the grooves intersect with each other is used for the intaglio gravure coating,
      the binder coating liquid supplied to the groove-shaped depressions shrinks to the intersections, and
      the shrunk binder coating liquid is coated on the collector in a dot shape.

2. The manufacturing method according to claim 1, wherein a length of the coated section in a direction parallel to a conveying direction of the collector is larger than a length in a direction perpendicular to the conveying direction.

3. The manufacturing method according to claim 1, wherein a glass transition temperature of the second binder used for the binder coating liquid is within a range −50° C. to 30° C.

4. The manufacturing method according to claim 1, wherein an exposed surface area ratio of the collector in the pattern coating is within a range of 10% to 85%, the exposed surface area ratio being a ratio of an exposed surface area of the collector to a total area of the collector.

5. A method for manufacturing a lithium ion secondary battery having electrodes in which a mix layer including a first binder and one of a positive electrode active material and a negative electrode active material is formed via a second binder on a collector, the method comprising:
   performing pattern coating of a binder coating liquid including the second binder on a surface of the collector to regularly form binder-coated sections and uncoated sections on the collector; and
   feeding a dry powder of mix particles including the positive electrode active material or the negative electrode active material and the first binder on the binder-coated sections and the uncoated sections so as to form the mix layer on the collector,
   wherein:
      the pattern coating is performed by intaglio gravure coating,
      an intaglio gravure roll incised with a plurality of groove-shaped depressions having intersections where the grooves intersect with each other is used for the intaglio gravure coating,
      the binder coating liquid supplied to the groove-shaped depressions shrinks to the intersections,
      the shrunk binder coating liquid is coated on the collector in a dot shape,
      the groove-shaped depressions have a shape such that grooves with a groove width of 10 μm to 40 μm, a groove pitch of 23 μm to 40 μm, and a groove depth of 5 μm to 20 μm are formed in a grid-shape pattern, and
      the collector and the binder coating liquid are selected such that a contact angle formed between a tangent of a liquid drop to a surface of the collector and the surface of the collector when the binder coating liquid is dropped on the collector is equal to or greater than 50 degrees.

* * * * *